US012659830B2

(12) United States Patent
Huang et al.

(10) Patent No.: US 12,659,830 B2
(45) Date of Patent: *Jun. 16, 2026

(54) SYSTEMS AND METHODS FOR DYNAMIC DATA SESSION MANAGEMENT

(71) Applicant: Verizon Patent and Licensing Inc., Basking Ridge, NJ (US)

(72) Inventors: Ye Huang, San Ramon, CA (US); Suzann Hua, Beverly Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 307 days.

This patent is subject to a terminal disclaimer.

(21) Appl. No.: 18/450,618

(22) Filed: Aug. 16, 2023

(65) Prior Publication Data

US 2025/0063450 A1      Feb. 20, 2025

(51) Int. Cl.
| | |
|---|---|
| *H04W 36/22* | (2009.01) |
| *H04W 28/02* | (2009.01) |
| *H04W 36/14* | (2009.01) |
| *H04W 88/06* | (2009.01) |

(52) U.S. Cl.
CPC ....... *H04W 36/22* (2013.01); *H04W 28/0284* (2013.01); *H04W 28/0289* (2013.01); *H04W 36/144* (2023.05); *H04W 88/06* (2013.01)

(58) Field of Classification Search
CPC ............... H04W 36/22; H04W 36/144; H04W 28/0284; H04W 28/0289
See application file for complete search history.

(56) References Cited

U.S. PATENT DOCUMENTS

| | | | |
|---|---|---|---|
| 10,841,791 B1 | 11/2020 | Zhang | |
| 2016/0353379 A1* | 12/2016 | Vrzic | ................ H04W 52/0235 |
| 2018/0103426 A1* | 4/2018 | Nacer | ............... H04W 52/0209 |
| 2018/0176862 A1 | 6/2018 | Malas | |
| 2018/0220294 A1 | 8/2018 | Ukil | |
| 2021/0068005 A1 | 3/2021 | Huang | |
| 2021/0234722 A1 | 7/2021 | Teboulle | |
| 2022/0377798 A1 | 11/2022 | Chien | |
| 2023/0037839 A1* | 2/2023 | Gupta | ...................... H04W 8/24 |
| 2023/0262724 A1* | 8/2023 | Liu | ........................ H04W 48/12 |
| | | | 370/329 |
| 2024/0127634 A1* | 4/2024 | Turner | .................. B60W 50/06 |
| 2024/0298252 A1 | 9/2024 | Sharma | |
| 2025/0008372 A1 | 1/2025 | Hua | |
| 2025/0063450 A1 | 2/2025 | Huang | |

OTHER PUBLICATIONS

Copending U.S. Appl. No. 18/343,965 titled Systems and Methods for Dynamic Data Session Management by Suzann Hua et al., filed Jun. 29, 2023, 30 pages.

* cited by examiner

*Primary Examiner* — Kevin M Cunningham

(57) ABSTRACT

A method may include establishing, for a user equipment (UE) device, a data session via a network and determining whether the network is congested or overloaded or whether a power level of the UE device is less than a threshold. The method may also include instructing the UE device to re-register for a Category M1 (Cat-M1) data session, in response to determining that the network is congested or overloaded or the power level of the UE device is less than the threshold.

20 Claims, 6 Drawing Sheets

FIG. 1

SYSTEMS AND METHODS FOR DYNAMIC DATA SESSION MANAGEMENT

BACKGROUND INFORMATION

In Fifth Generation (5G) network environments defined in accordance with the 3rd Generation Partnership Project (3GPP), a reduced capability (RedCap) new radio access type (RAT) associated with user equipment (UE) devices has been introduced. RedCap may support reduced bandwidth requirements for UE devices as compared to other types of RATs.

BRIEF DESCRIPTION OF THE DRAWINGS

FIG. 1 illustrates an exemplary environment in which systems and methods described herein may be implemented;

DETAILED DESCRIPTION OF EXAMPLE EMBODIMENTS

Figure 2:
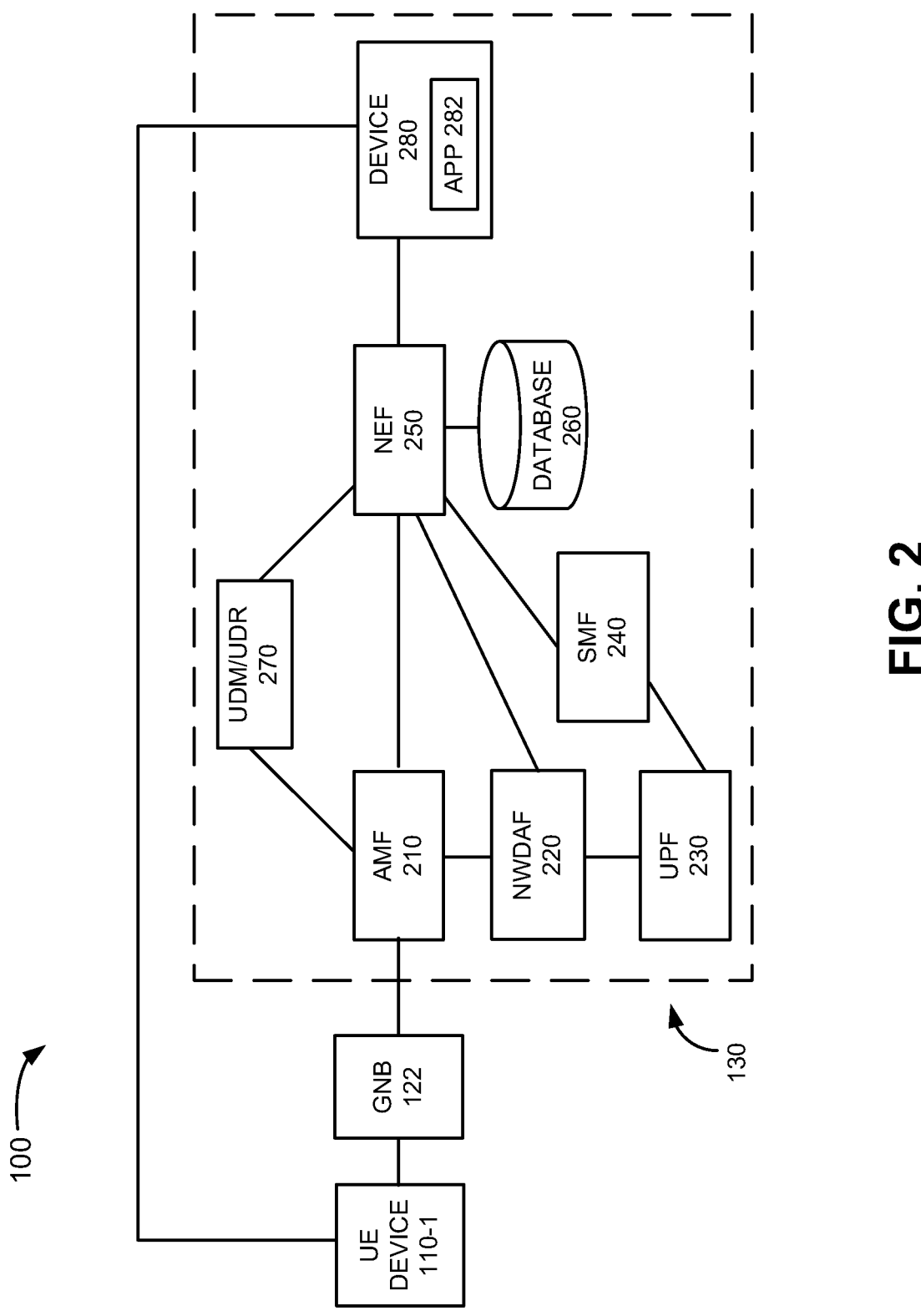
FIG. 2 is a block diagram of components implemented in the environment of FIG. 1 in accordance with an exemplary implementation.

The following detailed description refers to the accompanying drawings. The same reference numbers in different drawings may identify the same or similar elements.

Implementations described herein provide for dynamically switching types of data sessions for UE devices based on network load conditions and/or UE device power levels. In one implementation, a UE device that can support both RedCap and Category M1 (Cat-M1) communications may dynamically switch between a RedCap data session and a Cat-M1 data session based on whether a network is congested and/or overloaded. For example, when a network is congested or overloaded with traffic, a network element may instruct a UE device to switch from a RedCap data session and re-register for a Cat-M1 data session. The CAT-M1 data session may allow a UE device to operate with lower bandwidth and/or data usage requirements than a RedCap data session. When the overload/congestion no longer exists, the network element may instruct the UE device to switch back to a RedCap data session. In this manner, a UE device data session may be dynamically controlled to assist in reducing network congestion/overloading. For example, a service provider may provide some communications services to a device already operating in accordance with a RedCap RAT by switching to a Cat-M1 data session, as opposed to denying all data services to the UE device when a network is congested/overloaded. As a result, network usage may be reduced while the UE device is in a Cat-M1 mode.

In another implementation, a UE device that supports both RedCap and Cat-M1 communications may dynamically switch between a RedCap data session and a Cat-M1 data session based on a battery power level at the UE device. For example, if the battery level at the UE device is below a threshold, a network element may instruct the UE device to switch to a Cat-M1 data session. In either implementation, battery usage for a UE device may be less while in a Cat-M1 mode.

Figure 1:
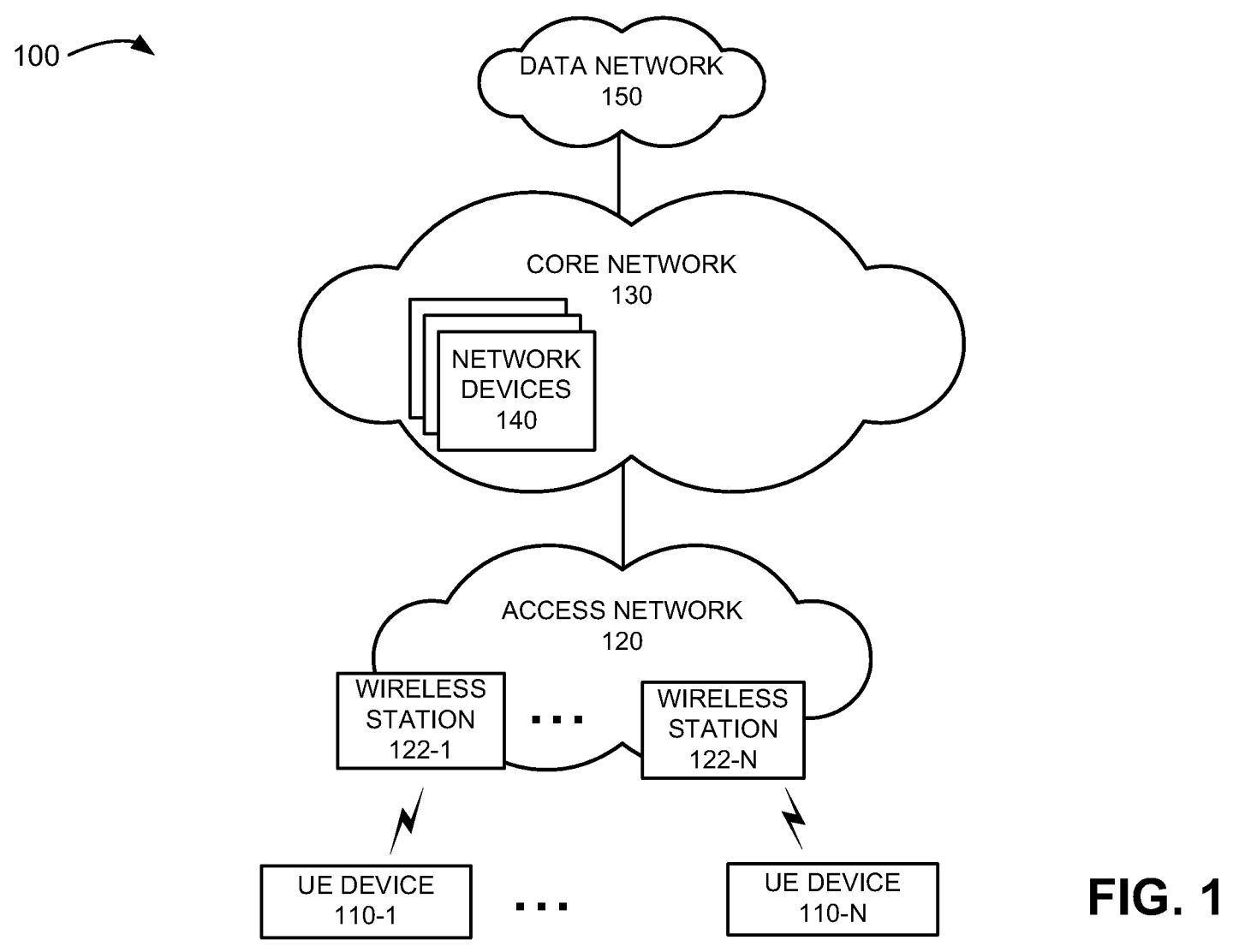

The term "network congestion" or "congestion" as used herein should be broadly construed to refer to a condition associated with a network in which a latency or delay associated with data transmissions is above a certain threshold, signal strength from user equipment (UE) devices is below a threshold and/or data collisions or interference is greater than a predetermined amount. The thresholds may be set by a service provider operating the network. The term "network overload" or "overload" as used herein should be broadly construed to refer to a level of traffic in a network or a portion of a network that is greater than a predetermined data traffic threshold and/or the quality of service (QOS) for traffic flows is lower than a certain QoS. The level of traffic and QoS may also be set by the service provider, FIG. 1 is a diagram illustrating an exemplary environment 100 in which systems and methods described herein may be implemented. Referring to FIG. 1, environment 100 includes user equipment (UE) devices 110-1 through 110-N, access network 120, wireless stations 122-1 through 122-N, core network 130, network devices 140 and data network 150.

UE devices 110-1 and 110-N (referred to herein individually as UE device or UE 110, and collectively as UE devices or UEs 110) may include any computing device, such as a personal computer (PC), a laptop computer, a server, a tablet computer, a notebook, a Chromebook®, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, a wearable device (e.g., a wrist watch, glasses, etc.), an Internet of Things (IoT) device, a Category M1 (Cat-M1) device, a machine type communication (MTC) device, etc., that includes communication functionality. In an exemplary implementation, some UE devices 110 may support both RedCap communications and Cat-M1 communications, as described in detail below.

UE device 110-1 may connect to access network 120 via wireless station 122-1 and UE device 110-N may connect to access network 120 via wireless station 122-N. UE devices 110 may also connect to other devices in environment 100 via other techniques, such as wired, wireless, optical connections or a combination of these techniques. UE device 110 and a person that may be associated with UE device 110 (e.g., the party holding or using UE device 110) may be referred to collectively as UE device 110 or UE 110 in the description below.

Access network 120, also referred to herein as radio access network (RAN) 120, may provide access to core network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a Fifth Generation (5G) access network or another advanced network, such as a Fourth Generation (4G) Long Term Evolution (LTE) access network. For example, access network 120 may include the functionality of a 5G network, such as 5G RAN communicating via mmWave technology, a 5G RAN communicating via C-band technology or other types of 5G networks. Access network 120 may also include a 4G RAN.

Access network 120 may also include: support for advanced or massive multiple-input and multiple-output (MIMO) antenna configurations (e.g., an 8×8 antenna configuration, a 16×16 antenna configuration, a 256×256 antenna configuration, etc.); support for cooperative MIMO (CO-MIMO) configurations; support for carrier aggregation; relay stations; Heterogeneous Networks (HetNets) of overlapping small cells and macrocells; Self-Organizing Network (SON) functionality; machine type communication (MTC) functionality, such as 1.4 MHz wide enhanced MTC (eMTC) channels (also referred to as Cat-M1), Low Power Wide Area (LPWA) technology such as Narrow Band (NB) IoT (NB-IoT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the UE devices 110 are within radio frequency range of wireless station 122. In one implementation, wireless station 122 may include 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. In other implementations, wireless station 122 may also include a 4G base station (e.g., an evolved NodeB (eNB)) or a 6G base station that communicates wirelessly with UE devices 110 located within the radio frequency range of wireless station 122.

Core network 130 may include one or more wired, wireless and/or optical networks that are capable of receiving and transmitting data, voice and/or video signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE or LTE Advanced network, a sixth generation (6G) network, and/or a legacy core network. Core network 130 may provide packet-switched services and wireless IP connectivity to various components in environment 100, such as UE devices 110, to provide, for example, data, voice, and/or multimedia services.

Core network 130 may include various network devices 140. Depending on the implementation, network devices 140 may include 5G core network components or network functions (NFs) (e.g., a User Plane Function (UPF), an Access and Mobility Management Function (AMF), a Session Management Function (SMF), a Unified Data Management (UDM) function, a Unified Data Repository (UDR), a Policy Control Function (PCF), a network data analytics function (NWDAF), a Charging Function (CHF), a network exposure function (NEF), an application function (AF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF) etc.), or another type of core network components (e.g., future 6G network components). In other implementation, network devices 140 may include combined 4G and 5G functionality, such as a session management function with PGW-control plane (SMF+PGW−C) and a user plane function with PGW-user plane (UPF+PGW−U).

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and wireless stations 122, as well as multiple access networks 120, core networks 130 and data networks 150. Environment 100 may also include elements, such as gateways, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

FIG. 2 illustrates a portion of environment 100, including elements implemented in core network 130 in accordance with an exemplary implementation. Referring to FIG. 2, network devices 140 in core network 130 include AMF 210, NWDAF 220, UPF 230, SMF 240, NEF 250, database 260, UDM/UDR 270 and device 280. It should be understood that core network 130 may include other elements/functions, such as those elements/functions described above with respect to FIG. 1, and/or differently arranged elements. Environment 100 also includes UE device 110-1 and wireless station 122 (depicted as gNB 122).

AMF 210 may perform registration management, connection management, reachability management, mobility management, lawful intercepts, Short Message Service (SMS) transport between UE device 110 and other network functions, session management messages transport between UE device 110 and SMF 240, access authentication and authorization, location services management, functionality to support non-3GPP access networks, and/or other types of management processes. In exemplary implementations, AMF 210 may initiate a re-registration process with respect to UE 110 based on instructions provided by NEF 250, as described in detail below.

NWDAF 220 may receive and/or collect analytics information associated with RAN 120 and/or core network 130. For example, NWDAF 220 may collect accessibility Key Performance Indicators (KPIs) (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, transmission time interval (TTI), average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs. NWDAF 220 may receive the KPIs from devices in RAN 120 and/or third party applications that monitor RAN 120 and/or core network 130. In an exemplary implementation, NWDAF 220 may continuously update the KPIs and provide network load information to NEF 250, as described in detail below.

UPF 230 may maintain an anchor point for intra/inter-RAT mobility, maintain an external Packet Data Unit point of interconnect to a data network (e.g., data network 150, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a RAN node (e.g., gNB/wireless station 122), and/or perform other types of user plane processes. In an exemplary implementation, UPF 230 may provide traffic monitoring information to NWDAF 220, which may supply the information to NEF 250, as described in detail below.

SMF 240 may perform session establishment, session modification, and/or session release, perform Internet Protocol (IP) address allocation and management, perform Dynamic Host Configuration Protocol (DHCP) functions, perform selection and control of UPF 230, configure traffic steering at UPF 230 to guide the traffic to the correct destinations, terminate interfaces toward a policy control function (PCF) (not shown), perform lawful intercepts, charge data collection, support charging interfaces, control and coordinate charging data collection, terminate session management parts of Non-Access Stratum (NAS) messages, perform downlink data notification, manage roaming functionality, and/or perform other types of control plane processes for managing user plane data. In an exemplary implementation, SMF 240 may provide network load-related information to NEF 250, as described in detail below.

NEF 250 may expose capabilities and events to other network functions (NFs), including third party NFs, application functions (AFs), edge computing NFs, and/or other types of NFs. Furthermore, NEF 240 may secure provisioning of information from external applications to core network 130, translate information between core network 130 and devices/networks external to core network 130, support a Packet Flow Description (PFD) function, and/or perform other types of network exposure functions.

In an exemplary implementation, NEF 250 may obtain network load information from NWDAF 220, SMF 240 and/or other functions or devices in environment 100. NEF 250 may also obtain information from, for example, UDM/

UDR 270 to determine whether a UE device 110 is a dual capability or dual mode device, such as a device that supports both RedCap and Cat-M1 communications. NEF 250 may provide the network load information and/or the dual capability status for UE device 110 to device 280, as described in detail below.

Database 260 may store information obtained by NEF 250. For example, database 260 may store information for UEs 110, such as whether a particular UE 110 is a dual mode device capable of both RedCap and Cat-M1 communications, a current RAT used by the UE 110, a current power level associated with the battery of the UE 110, etc. This information may be used to initiate a re-registration of UE device 110, causing UE device 100 to switch from one type of data session to another type of data session, as described in detail below.

UDM/UDR 270, shown as a single device in FIG. 2 may include both a UDM and a UDR. The UDM and UDR may be referred to together herein as UDM/UDR 270. The UDM portion of UDM/UDR 270 may maintain subscription information for UE devices 110, manage subscriptions, generate authentication credentials, handle user identification, perform access authorization based on subscription data, perform network function registration management, maintain service and/or session continuity by maintaining assignment of an SMF 240 for ongoing sessions, support Short Message Service (SMS) delivery, support lawful intercept functionality, and/or perform other processes associated with managing user data. The UDR portion of UDM/UDR 270 may store the subscription information obtained and managed by the UDM. For example, the UDR may store subscription information and subscriber profile information maintained by the UDM. In an exemplary implementation, UDM/UDR 270 may store subscriber profile information indicating whether UE devices 110 can operate as a RedCap device and/or a Cat-M1 device.

Device 280 may include a computer device, server device, network function and/or any computing device with processing and communication capabilities. In an exemplary implementation, device 280 includes an application 282 (also referred to herein as app 280) that includes instructions for communicating with various devices/network functions in environment 100 and initiating re-registration of UE 110*s*, such as UE 110-1 based on network conditions and/or a battery power level for UE 110-1, as described in detail below.

Environment 100 illustrated in FIG. 2 may include additional elements and/or NFs that are not illustrated. Such elements and/or NFs may provide security, authentication and authorization, network polices, subscriber profiles, network slicing, and/or facilitate the operation of core network 130. It should also be understood that functions described as being performed by various elements in FIG. 2, including elements in core network 130, may be performed by other elements/functions in other implementations.

Figure 3:
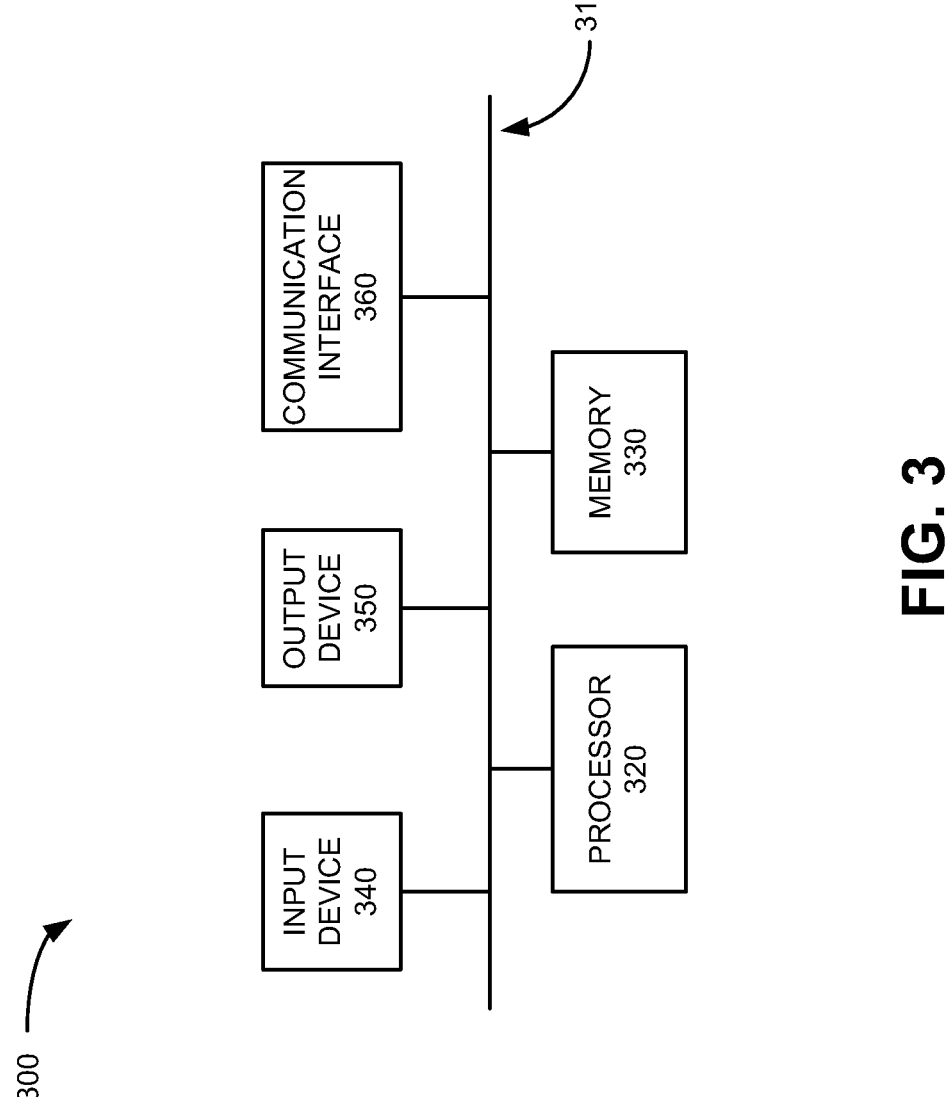
FIG. 3 illustrates logic components implemented in one or more of the devices illustrated in FIGS. 1 and 2 in accordance with an exemplary implementation.

FIG. 3 illustrates an exemplary configuration of a device 300. One or more devices 300 may correspond to or be included in devices in environment 100, such as UE device 110, wireless station 122, network devices 140, such as AMF 210, NWDAF 220, UPF 230, SMF 240, NEF 250, database 260, UDM/UDR 270, device 280 and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. It should be understood that device 300 may include more or fewer components than illustrated in FIG. 3.

Bus 310 may include communication paths between components 320-360 of device 300. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 340 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4A:
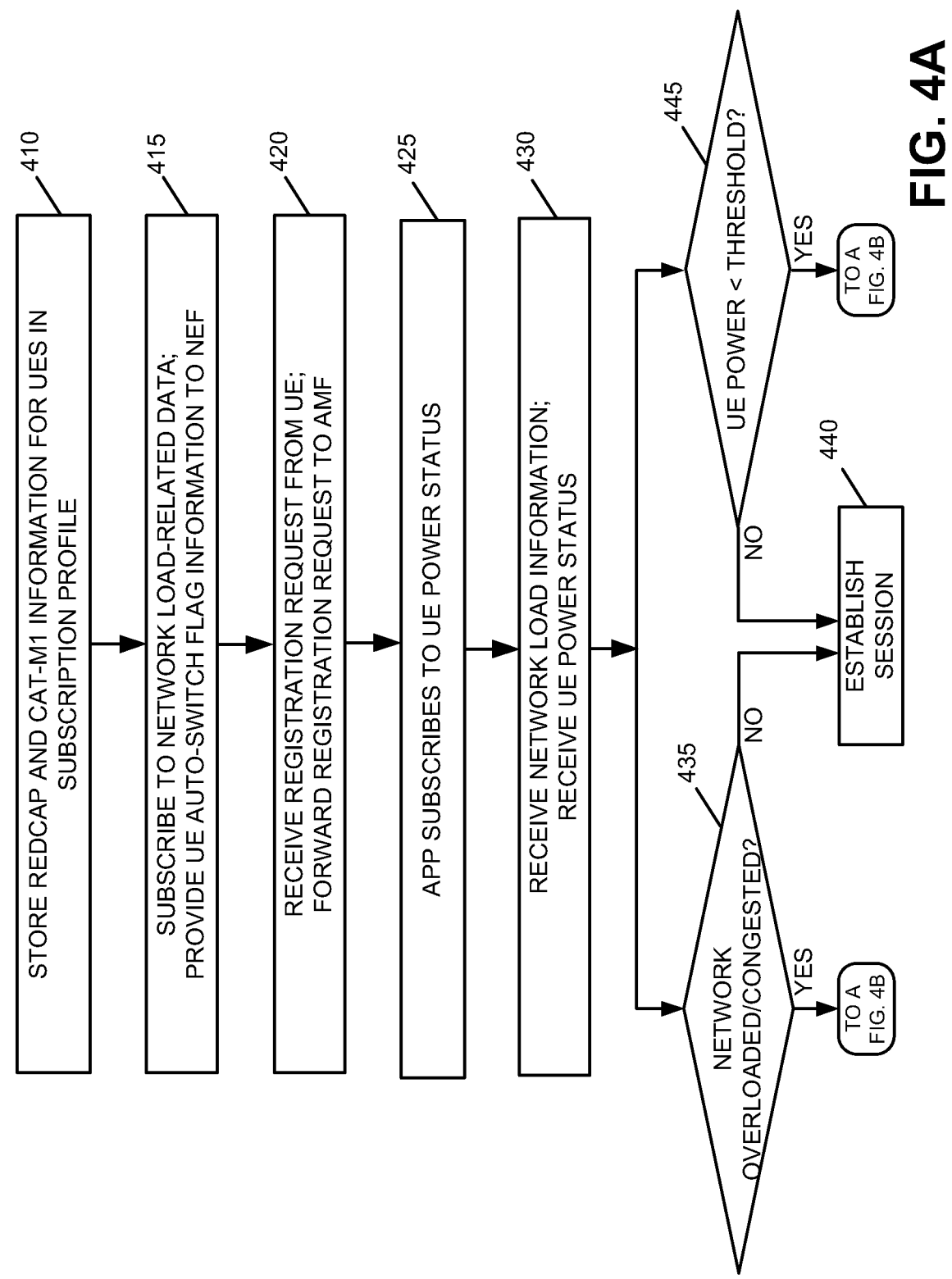
FIGS. 4A and 4B are flow diagrams illustrating processing associated with dynamically switching from a RedCap data session to another type of data session, and vice versa, in accordance with an exemplary implementation.
Figure 4B:
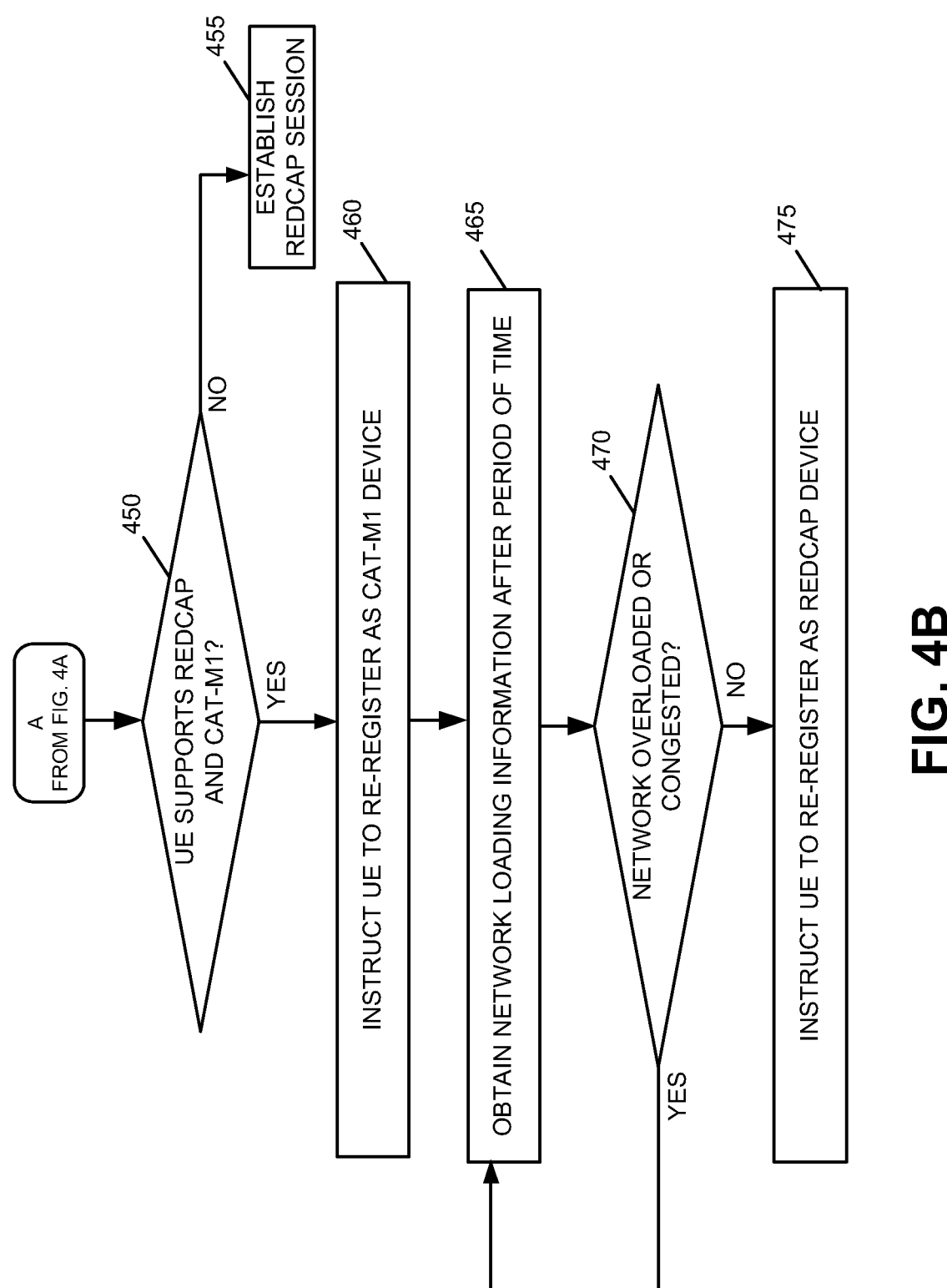
Figure 5:
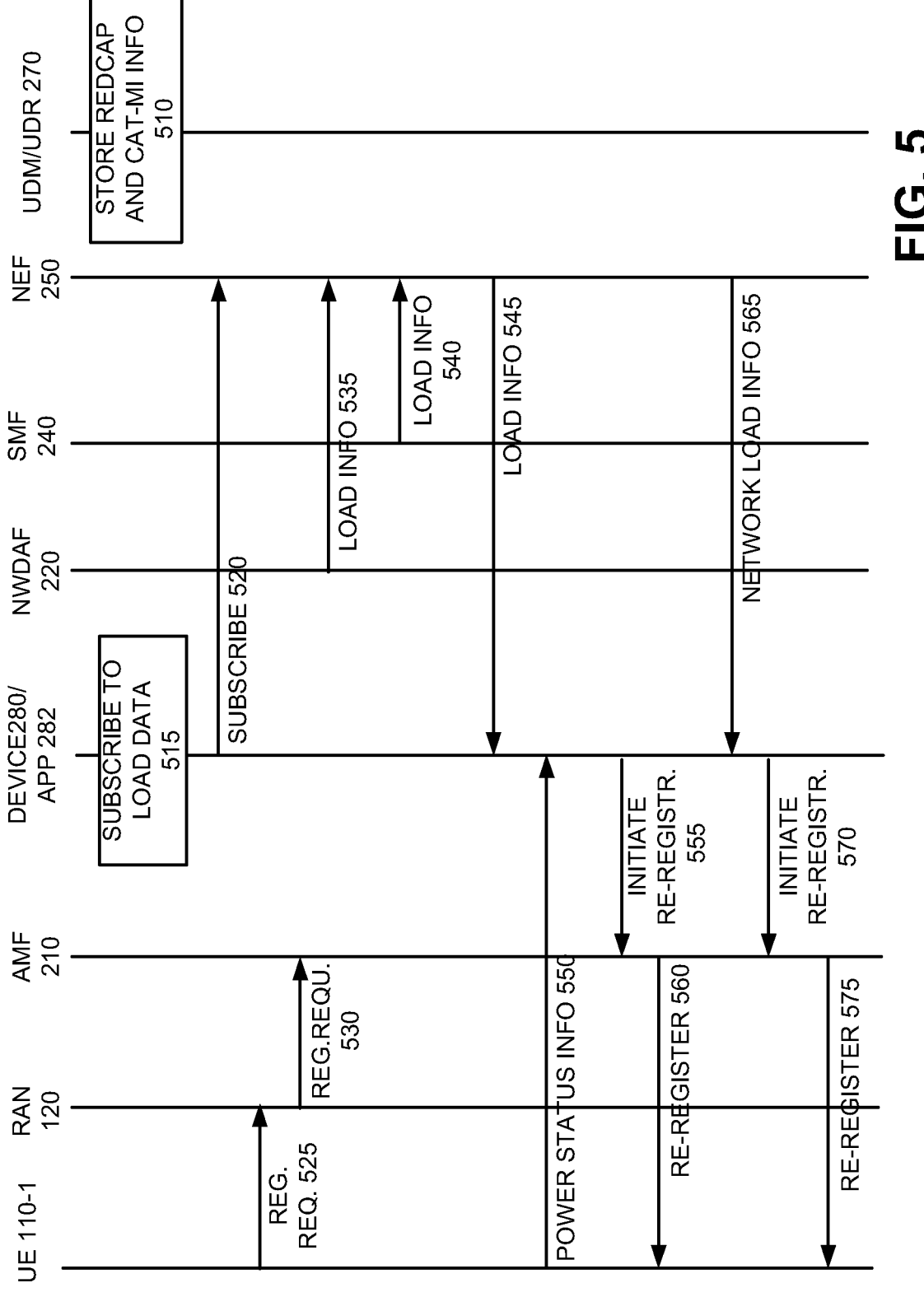
FIG. 5 is an exemplary signal flow diagram associated with the processing of FIGS. 4A and 4B.

FIGS. 4A and 4B are flow diagrams illustrating processing associated with dynamically changing a type of UE data session in accordance with an exemplary implementation. FIG. 5 is a signal flow diagram illustrating exemplary signal flows associated with the processing of FIGS. 4A and 4B. Processing may begin with storing UE device capability information in UDM/UDR 270 (FIG. 4A, block 410; FIG. 5, block 510). For example, a service provider associated with environment 100 may store subscription profile information for UE devices 110 in UDM/UDR 270 indicating whether each UE device 110 supports both RedCap and Cat-M1 communications. In some implementations, UE devices 110 may support RedCap by default. That is, in some implementations, each of UE devices 110 may support RedCap communications. Further, in some implementations, some UE devices 110 may register as RedCap devices and request RedCap data session when initially registering for data sessions. In each case, the service provider may store RedCap and Cat-M1 capability information for UE devices 110 in UDM/UDR 270. NEF 250 may also obtain the profile information from UDM/UDR 270 indicating whether UE devices 110 can operate as both a RedCap device and a Cat-M1 device and store the profile information in database 260

Device 280/app 282 may also subscribe to network load information (block 415; FIG. 5, block 515). For example, app 282 may send a subscription request to NEF 250 indicating that device 280 is to receive network load information, such as protocol data unit (PDU)/traffic flow information, QoS information, bandwidth information, etc. (FIG. 5, 520). App 282 may also provide a current UE RAT and RAT auto-switch flag to NEF 250 (block 415). For example, each UE 110 may communicate with device 280 indicating whether UE 110 wishes to automatically switch from a Cat-M1 data session to a RedCap data session based on various network factors, including network load information, UE battery power status information, etc., as described in detail below. The auto-switch flag may be set to "1" if auto-switching from RedCap to Cat-M1 is enabled. In some implementations, a UE 110 may indicate upon registration with core network 130 whether that particular UE 110 will subscribe to auto-switching. In this example, assume that UE 110-1 transmits a current UE RAT with which UE 110-1 will initially establish communications, along with a RAT auto-switch flag to device 280. Device 280 may forward the auto-switch flag information to NEF 250 and NEF 250 may store the auto-switch flag information for UE 110-1 in database 260. Other data may also be stored in database 260, such as battery power level for UEs 110, QoS or bandwidth levels for UEs 110, etc. Device 280 and/or NEF 250 may initiate auto-switching decisions based on this other information (i.e., battery power level, QoS values, bandwidths, etc.

In this example, further assume that UE 110-1 transmits a registration request and wireless station 122-1 in RAN 120 receives the registration request (block 420; FIG. 5, 525). RAN 120 may forward the registration request to AMF 210 (block 420; FIG. 5, 530). As described above, in some implementations, UE 110-1 may initially send a registration request indicating that UE 110-1 will establish a communication session as a RedCap device.

AMF 210 may receive the registration request and perform authentication associated with registering UE 110-1. For example, AMF 210 may determine if UE 110-1 is authorized to establish a data session, such as whether UE 110-1 is associated with a subscriber to core network 130. For this example, assume that UE 110-1 is authenticated.

In an exemplary implementation, device 280/app 282 may also subscribe to or receive UE 110 power status information via, for example, an open mobile alliance-device management (OMA-DM) system that allows UE 110 to transmit power status information regarding the current battery life of UE 110 to device 280 (block 425). The power status information may indicate a percentage of the current battery life for UE 110, a relative battery life (e.g., normal, low, very low, etc.) or another power status identifying the power level associated with the battery in UE 110. Based on the received battery life information, app 282 may initiate a switch from, for example, a Cat-M1 data session to a RedCap data session based on the battery life, as described in detail below As described above, device 280 may subscribe to NEF 250 to obtain network load information. For example, NEF 250 may interface with NWDAF 220 and/or SMF 240 to obtain data regarding network loading. Alternatively, or in addition, NEF 250 may subscribe to or receive network load information from a "data lake" operated by the service provider associated environment 100. The data lake (not shown in FIG. 2) may store data regarding the network load, congestion, QoS levels, etc. In each case, NEF 250 may request that NWDAF 220, SMF 240 and/or the data lake notify NEF 250 when the network is overloaded or congested. NWDAF 220, SMF 240 and/or the data lake may provide the requested network load information in a report to NEF 250 indicating that the network is congested and/or overloaded, that the traffic flow latency of UE data has risen below a threshold, and/or some other indication of a congested or overloaded network (e.g., throughput).

In each case, NEF 250 receives the network load reports from NWDAF 220, SMF 240 and/or the data lake (block 430; FIGS. 5, 535 and 540). NEF 250 may provide the network load information to device 280 (FIG. 5, 545). As described above, in some implementations, device 280/app 282 may also receive UE 110 information identifying the battery level of UE 110-1 from UE 110-1 (block 430; FIG. 5, 550).

Device 280 may then determine if the network is overloaded or congested and if so, whether UE 110-1 is located in a RedCap UE service area (block 435). For example, certain geographical areas of environment 100 may be designated RedCap UE service areas that support RedCap communications to/from UE devices 110. If device 280 determines that the network is not congested or overloaded and/or UE 110-1 is not located in a RedCap UE service area (block 435—no), device 280 may signal AMF 210 and/or other devices in core network 130 to establish a data session for UE 110-1 (block 440). For example, AMF 210 may transmit a registration accept message to UE 110-1 (not shown in FIG. 5). In this scenario, the UE device 110-1 data session (e.g., protocol data unit (PDU) session) will be established in a conventional manner in accordance with the subscriber profile associated with UE 110-1.

If, however, device 280 determines that the network is congested and/or or overloaded and that UE 110-1 is located in a RedCap UE service area (block 440—yes), device 280 may determine whether the subscriber profile of UE 110-1 indicates that UE 110-1 supports both RedCap and Cat-M1 communications (FIG. 4B, block 450). For example, device 280 may access NEF 250 and/or database 260 to identify whether UE 110-1 supports both RedCap and Cat-M1 communications. For example, as described previously, database 260 may store information indicating whether UE 110-1 supports both RedCap and Cat-M1 communications. NEF 250 and/or database 260 may supply the requested information to device 280. Device 280 may then determine whether UE 110-1 supports both RedCap and Cat-M1.

If device 280 determines that UE 110-1 supports RedCap, but does not support Cat-M1 communications (block 450—no), device 280 may instruct AMF 210 and/or other elements in core network 130 to establish, for example, a RedCap data session (block 455). For example, AMF 210 may transmit a registration accept message to UE 110-1 indicating that a RedCap data session will be established.

If, however, device 280 determines that UE 110-1 supports both RedCap and Cat-M1 communications (block 450—yes), device 280 may invoke an NEF Application Programming Interface (API) to request NEF 250 to initiate a switch from a current RedCap RAT type data session to Cat-M1 RAT type data session. For example, device 280, via the NEF API, may signal NEF 250 to instruct AMF 210 to initiate a re-registration for UE 110-1 from RedCap to Cat-M1 (FIG. 5, 555). AMF 210 may then instruct UE 110-1 to re-register as a Cat-M1 device (block 460; FIG. 5, 560).

UDM/UDR 270 may also receive notification of the RAT type switching associated with UE 110-1 and provide the current RAT type to other components of core network 130 (e.g., NEF 250). In situations in which auto-switching is enabled for UE 110-1, as indicated in database 260, NEF 250 may instruct AMF 210 to initiate the re-registration process. That is, device 280 may not need to initiate the re-registration procedure since auto-switching is enabled. In addition, in some implementations, NEF 250 initiated switching of RAT types may overwrite the auto-switching information stored in database 260. That is, if NEF 250 initiates a switch from RedCap to Cat-M1, the auto-switching flag in database may be changed to "1" for future switching decision. In each case, when network conditions are overloaded or congested, core network 130 may dynamically instruct a UE 110 to register for a Cat-M1 data session, as opposed to denying service to UE 110. In situations in which a device is an IoT device or a wearable device, the Cat-M1 data session allows UEs 110 to operate in lower bandwidth ranges and/or provide lower data throughput, while still providing some services, such as Voice over Internet Protocol (VOIP) services or other data services.

Returning to FIG. 4A, in implementations in which device 280 receives power status information from UE 110-1, device 280 may determine whether the battery power level of UE 110-1 is less than a threshold power level (block 445). For example, the threshold power status may be 10% remaining battery life. If device 280 determines that the battery power level is not less than the threshold (block 445—no), device 280 may signal AMF 210 and/or other devices in core network 130 to establish a data session for UE 110-1 (block 440). For example, AMF 210 may transmit a registration accept message to UE 110-1 (not shown in FIG. 5). In this scenario, the UE device 110-1 data session (e.g., protocol data unit (PDU) session) will be established in a conventional manner in accordance with the subscriber profile associated with UE 110-1.

If, however, device 280 determines that UE 110's battery power level is less than the threshold (block 445—yes), device 280 determines whether UE 110-1 is located in a RedCap UE service area. For example, device 280 may determine whether the subscriber profile of UE 110-1 indicates that UE 110-1 supports both RedCap and Cat-M1 communications. For example, device 280 may access NEF 250 and/or database 260 to identify whether UE 110-1 supports both RedCap and Cat-M1 communications (block 450). For example, as discussed previously, database 260 may store information indicating whether UE 110-1 supports both RedCap and Cat-M1 communications. NEF 250 and/or database 260 may supply the requested information to device 280. Device 280 may then determine whether UE 110-1 supports both RedCap and Cat-M1.

If device 280 determines that UE 110-1 supports RedCap, but does not support Cat-M1 communications (block 450—no), device 280 may instruct AMF 210 and/or other elements in core network 130 to establish, for example, a RedCap data session (block 455). For example, AMF 210 may transmit a registration accept message to UE 110-1 indicating that a RedCap data session will be established.

If, however, device 280 determines that UE 110-1 supports both RedCap and Cat-M1 communications (block 450—yes), device 280 may invoke an NEF API to request NEF 250 to initiate a switch from a current RedCap RAT type data session to Cat-M1 RAT type data session. For example, device 280, via the NEF API, may signal AMF 210 to initiate a re-registration process (FIG. 5, 555). AMF 210 receives the signal from device 280 and signals UE 110-1 to re-register as a Cat-M1 device (block 460; FIG. 5, 560). UDM/UDR 270 may also receive notification of the RAT type switching and provide the current RAT type to other components of core network 130 (e.g., NEF 250). In this manner, when battery conditions at UE 110-1 are below a threshold, core network 130 may dynamically instruct a UE 110 to register for a Cat-M1 data session, as opposed to denying service to UE 110. In situations in which a device is an IoT device or a wearable device, the Cat-M1 data session allows UEs 110 to operate in lower bandwidth ranges and/or provide lower data throughput, while still providing some services, such as Voice over Internet Protocol (VOIP) services or other data services.

Device 280, via NEF 250, may continue to monitor network load conditions. For example, device 280 may periodically receive information from NEF 250 (e.g., every hour or less, every two hours, every four hours, etc.) regarding network load information (FIG. 4B, block 465; FIG. 5, 565). Device 280 may then determine whether the network remains congested or overloaded (block 470). If device 280 determines that the network remains congested and/or overloaded (block 470—yes), processing may return to block 465 and device 280 may continue to periodically monitor network load conditions. If, however, device 280 determines that the network is no longer congested or overloaded (block 470—no), device 280 may signal AMF 210 to initiate a re-registration procedure (block 475; FIG. 5, 570). For example, device 280 may signal AMF 210 to instruct UE 110-1 to re-register as a RedCap device, and AMF 210 may forward the re-registration instruction to UE 110-1 (FIG. 5, 575).

Similar processing may proceed with respect to UE 110-1 battery level. For example, device 280 may periodically receive the battery power level for 110-1. If the battery power level is greater than the threshold, device 280 may initiate a re-registration procedure for UE 110-1 to re-register UE 110-1 from a Cat-M1 data session to a RedCap data session.

In this manner, device 280 and/or other devices in environment 100 may dynamically signal UE devices 110 to register using a first RAT, such as RedCap RAT, and re-register using another RAT, such as Cat-M1 RAT, based on the network load conditions and/or battery power levels at UE devices 110. In some implementations, device 280 may consider data usage by a UE 110 when determining whether to signal the UE 110 to re-register as a Cat-M1 device. For example, if the data usage of UE 110-1 is very low, device 280 may not instruct UE 110-1 to switch to a Cat-M1 data session when the network is congested and/or overloaded. By not switching a data session when data usage by a UE 110 is low, additional signaling may be reduced. For example, signaling associated with re-registering may be eliminated.

Implementations have been described above with respect to a UE device 110 registering for a data session as a RedCap device and core network elements dynamically changing the type of data session to a Cat-M1 data session based on network load conditions and/or battery conditions at UE devices 110. In other implementations, core network elements may dynamically switch between other types of data sessions or RATs (e.g., narrow band (NB)-IoT) based on network load conditions and/or battery conditions where a first type of data session has higher bandwidth and/or throughput requirements than a second type of data session.

In addition, in some situations, a wireless station 122, such as a gNB, may not support a Cat-M1 RAT. In such situations, an LTE device, such as a mobility management entity (MME) may interface with an eNB wireless station 122 to instruct a UE 110 to re-register as a Cat-M1 device.

Implementations described herein provide for dynamically switching types of data sessions for UE devices 110 based on network load conditions and/or battery power levels, such as switching from a RedCap data session to a Cat-M1 data session. In this manner, lower bandwidth and/or data usage requirements for a Cat-M1 data session may help reduce network loading when a network is congested or overloaded. In addition, switching to a Cat-M1 data session may reduce battery usage on a UE device 110. Further, by switching back to a RedCap data session based on monitored network load conditions and/or battery levels, UE device 110 may obtain higher bandwidth services and/or data usage when network conditions are no longer overloaded/congested and/or the battery level of UE device 110 is adequate.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described with respect to managing types of data sessions/RATs using elements in core network 130. In other implementations, similar processing may be performed in other portions of environment 100, such as in a Multi-access Edge Computing (MEC) platform located, for example, between access network 120 and core network 130. In still other implementations, a number of AMFs 210, NWDAFs 220, UPFs 230, SMFs 240, NEFs 250, databases 260, UDM/UDRs 270 and devices 280 may be distributed in environment 100 to perform data session management.

Further, while series of acts have been described with respect to FIGS. 4A and 4B and signal flows with respect to FIG. 5, the order of the acts and signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
establishing, for a user equipment (UE) device, a data session via a network;
determining whether the network is at least one of congested or overloaded, wherein the determining comprises:
receiving, from a network exposure function (NEF), information associated with network load conditions, and
making the determination whether the network is at least one of congested or overloaded based on the information received from the NEF; and
instructing the UE device to re-register for a Category M1 (Cat-M1) data session, in response to determining that the network is congested or overloaded.

2. The method of claim 1, further comprising:
monitoring, at a first time and after determining that the network is at least one of congested or overloaded, whether the network remains at least one of congested or overloaded; and
instructing the UE device, in response to determining that the network does not remain at least one of congested or overloaded, to re-register for the data session using a reduced capability radio access type (RAT).

3. The method of claim 2, further comprising:
requesting, by a device, network load information from the NEF.

4. The method of claim 1, wherein the data session corresponds to a reduced capability data session.

5. The method of claim 1, further comprising:
receiving, from the UE device, information identifying a power level of the UE device, and
comparing the power level to a threshold.

6. The method of claim 5, further comprising:
instructing the UE device to re-register for a Cat-M1 data session in response to the comparing indicating that the power level of the UE device is less than the threshold.

7. The method of claim 1, further comprising:
determining whether the UE device is located in an area that supports a reduced capability RAT, and wherein the establishing a data session comprises:
establishing a reduced capability data session, in response to determining that the UE device is located in an area that supports the reduced capability RAT.

8. The method of claim 1, wherein the information associated with network load conditions includes network load information, the method further comprising:

providing, by the NEF and to a device, the network load information;
determining, by the device, that the network is at least one of congested or overloaded based on the network load information; and
determining, by the device and in response to determining that the network is at least one of congested or overloaded, whether the UE device is capable of reduced capability communications and Cat-M1 communications.

9. The method of claim 1, further comprising:
receiving, from the UE device, information indicating whether switching from a reduced capability data session to a Cat-M1 data session is to be enabled.

10. The method of claim 1, further comprising:
dynamically switching between a reduced capability data session and a Cat-M1 data session for the UE device based on network load conditions.

11. A system, comprising:
at least one device comprising at least one processor, the at least one device configured to:
establish, for a user equipment (UE) device, a data session via a network;
determine whether the network is at least one of congested or overloaded, wherein when determining, the at least one device is configured to:
receive, from a network exposure function (NEF), information associated with network load conditions, and
make the determination whether the network is at least one of congested or overloaded based on the information received from the NEF; and
instruct the UE device to re-register for a Category M1 (Cat-M1) data session, in response to determining that the network is congested or overloaded.

12. The system of claim 11, wherein the at least one device is further configured to:
monitor, at a first time and after determining that the network is at least one of congested or overloaded, whether the network remains at least one of congested or overloaded; and
instruct the UE device, in response to determining that the network does not remain at least one of congested or overloaded, to re-register for the data session using a reduced capability radio access type (RAT).

13. The system of claim 11, wherein the at least one device comprises the NEF, a network data analytics function (NWDAF) and a device configured to receive information from the NEF, and when determining, the at least one device is configured to:
request, by the device, network load information from the NEF.

14. The system of claim 11, wherein the at least one device is further configured to:
receive, from the UE device, information identifying a power level of the UE device,
compare the power level to the threshold; and
instruct the UE device to re-register for a Cat-M1 data session when the comparing indicates that the power level of the UE device is less than the threshold.

15. The system of claim 11, wherein the at least one device is further configured to:
determine whether the UE device is located in an area that supports a reduced capability RAT, and
wherein when establishing the data session, the at least one device is configured to:

establish a reduced capability data session, in response to determining that the UE device is located in an area that supports the reduced capability RAT.

16. The system of claim 11, wherein the at least one device is further configured to:

receive, from the UE device, information indicating whether switching from a reduced capability data session to a Cat-M1 data session is to be enabled.

17. The system of claim 11, wherein the at least one device is further configured to:

dynamically switch between a reduced capability data session mode and a Cat-M1 data session mode for the UE device based on network load conditions.

18. A non-transitory computer-readable medium having stored thereon sequences of instructions which, when executed by at least one processor, cause the at least one processor to:

identify a data session established for a user equipment (UE) device;

determine whether a network is at least one of congested or overloaded, wherein when determining, the instructions cause the at least one processor to:

receive from a network exposure function (NEF), information associated with network load conditions, and make a determination whether the network is at least one of congested or overloaded based on the information received from the NEE; and initiate a re-registration procedure instructing the UE device to re-register for a Category M1 (Cat-M1) data session, in response to determining that the network is congested or overloaded.

19. The non-transitory computer-readable medium of claim 18, wherein the data session is associated with a reduced capability radio access type (RAT), and wherein the instructions include instructions to further cause the at least one processor to:

monitor, at a first time and after determining that the network is congested or overloaded, whether the network remains at least one of congested or overloaded; and instruct the UE device, in response to determining that the network does not remain at least one of congested or overloaded, to re-register for the data session using a reduced capability radio access type (RAT).

20. The non-transitory computer-readable medium of claim 18, wherein the instructions includes instructions to further cause the at least one processor to:

dynamically instruct the UE device to re-register for a reduced capability data session mode or a Cat-M1 data session mode based on network load conditions or a power level of the UE device.

* * * * *